United States Patent
Coronado et al.

(10) Patent No.: US 8,108,732 B2
(45) Date of Patent: *Jan. 31, 2012

(54) APPARATUS AND METHOD TO MINIMIZE PERFORMANCE DEGRADATION DURING COMMUNICATION PATH FAILURE IN A DATA PROCESSING SYSTEM

(75) Inventors: Juan Alonso Coronado, Tucson, AZ (US); Roger Gregory Hathorn, Tucson, AZ (US); Bret Wayne Holley, Tucson, AZ (US); Clarisa Valencia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/141,866

(22) Filed: Jun. 18, 2008

(65) Prior Publication Data
US 2009/0319822 A1 Dec. 24, 2009

(51) Int. Cl.
*G06F 11/00* (2006.01)

(52) U.S. Cl. ............ 714/43; 714/4.1; 714/47.2; 714/48; 714/56; 714/57; 370/225

(58) Field of Classification Search ............... 714/4, 5, 714/11, 43, 47, 48, 56, 57, 4.1, 5.1, 47.1, 714/47.2; 370/216, 225, 227, 228
See application file for complete search history.

(56) References Cited

U.S. PATENT DOCUMENTS

| | | | |
|---|---|---|---|
| 6,092,216 A * | 7/2000 | Kobayashi et al. ............ | 714/47 |
| 6,718,472 B1 | 4/2004 | Garnett | |
| 6,725,295 B2 | 4/2004 | Iwatani | |
| 6,732,186 B1 | 5/2004 | Herbert | |
| 6,769,071 B1 * | 7/2004 | Cheng et al. ................... | 714/4 |
| 6,907,377 B2 * | 6/2005 | Slaight et al. ................. | 370/241 |
| 6,996,629 B1 | 2/2006 | Odenwald | |
| 7,152,178 B1 | 12/2006 | Vook et al. | |
| 7,180,867 B2 | 2/2007 | Hoch et al. | |
| 7,203,161 B2 | 4/2007 | Beer et al. | |
| 7,275,103 B1 * | 9/2007 | Thrasher et al. ............. | 709/224 |
| 7,565,570 B2 * | 7/2009 | Dohi ............................. | 714/6 |
| 7,634,691 B2 * | 12/2009 | Komatsu et al. ............. | 714/43 |
| 2003/0160781 A1 * | 8/2003 | Berndt et al. ................. | 345/419 |
| 2004/0076159 A1 | 4/2004 | Utsubo | |
| 2004/0230713 A1 * | 11/2004 | Brice et al. ..................... | 710/15 |
| 2007/0271481 A1 * | 11/2007 | Kawakami et al. ........... | 714/5 |
| 2008/0250042 A1 * | 10/2008 | Mopur et al. ................. | 707/100 |

* cited by examiner

Primary Examiner — Robert Beausoliel, Jr.
Assistant Examiner — Joseph D Manoskey
(74) Attorney, Agent, or Firm — Dale F. Regelman; Quarles & Brady LLP

(57) ABSTRACT

A method to minimize performance degradation during communication path failure in a data processing system, comprising a host computer, a storage controller, and a plurality of physical communication paths in communication with the host computer and the storage controller, where the method establishes a threshold communication path error rate, and determines an (i)th actual communication path error rate for an (i)th physical communication path, wherein that (i)th communication path is one of the plurality of physical communication paths. If the (i)th actual communication path error rate is greater than the threshold communication path error rate, the method discontinues use of the (i)th physical communication path.

14 Claims, 4 Drawing Sheets

US 8,108,732 B2

APPARATUS AND METHOD TO MINIMIZE PERFORMANCE DEGRADATION DURING COMMUNICATION PATH FAILURE IN A DATA PROCESSING SYSTEM

FIELD OF THE INVENTION

This invention relates to an apparatus and method to minimize performance degradation during communication path failure in a data processing system.

BACKGROUND OF THE INVENTION

Computing devices generate information. It is known in the art to store such information using a plurality of data storage devices disposed in an automated data storage system. An originating host computer may be in communication with a storage controller using a plurality of communication paths.

Using prior art methods, when a host computer detects a path failure during I/O to a storage device the host computer begins a path verification protocol. The host computer typically sends path verification commands to the device through each logical path recited in a device path mask. If the data returned in one of the path verification commands does not match the expected result, or the host path verification command times out, the host removes that logical path from the device path mask. At the completion of the path verification process, the device path mask may or may not still include the failed logical path.

The path verification process can become extremely time consuming if I/O failures are detected for multiple logical control units within the failure window of the several logical paths. As a result, a host computer can expend an inordinate amount of time and processing resources executing path verification commands rather than I/O commands. As a result, data storage system performance can be degraded.

SUMMARY OF THE INVENTION

Applicants' invention comprises a method to minimize performance degradation during communication path failure in a data processing system, comprising a host computer, a storage controller, and a plurality of physical communication paths in communication with the host computer and the storage controller. The method establishes a threshold communication path error rate, and determines an (i)th actual communication path error rate for an (i)th physical communication path, wherein that (i)th physical communication path is one of the plurality of physical communication paths. If the (i)th actual communication path error rate is greater than the threshold communication path error rate, the method discontinues use of the (i)th physical communication path.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
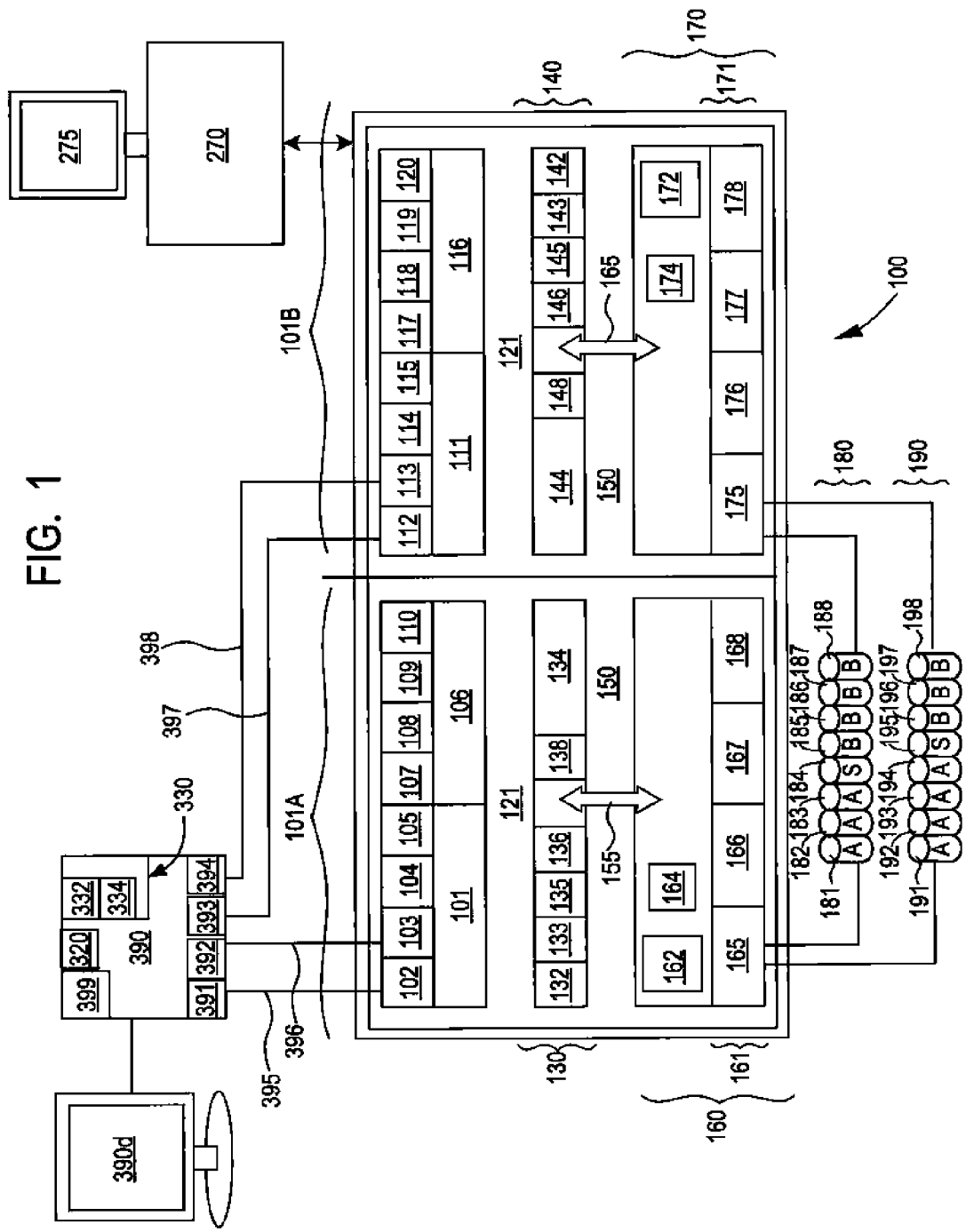
FIG. 1 is a block diagram showing a host computer in communication with Applicants' data storage system.

Referring now to FIG. 1, in certain embodiments Applicants' data processing system comprises data storage system 100 and one or more host computers 390. In the illustrated embodiment of FIG. 1, data storage system 100 is in communication with host computer 390 via physical communication paths 395, 396, 397, 398. In certain embodiments, communication paths 395, 396, 397, and 398, each comprise a physical communication link, wherein that physical communication link can be configured to comprise up to 256 logical pathways. The illustrated embodiment of FIG. 1 shows a single host computer. In other embodiments, data storage system 100 is in communication with a plurality of host computers.

Host computer 390 comprises a computer system, such as a mainframe, personal computer, workstation, and combinations thereof, including an operating system such as Windows, AIX, Unix, MVS, LINUX etc. (Windows is a registered trademark of Microsoft Corporation; AIX is a registered trademark and IVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

Figure 2:
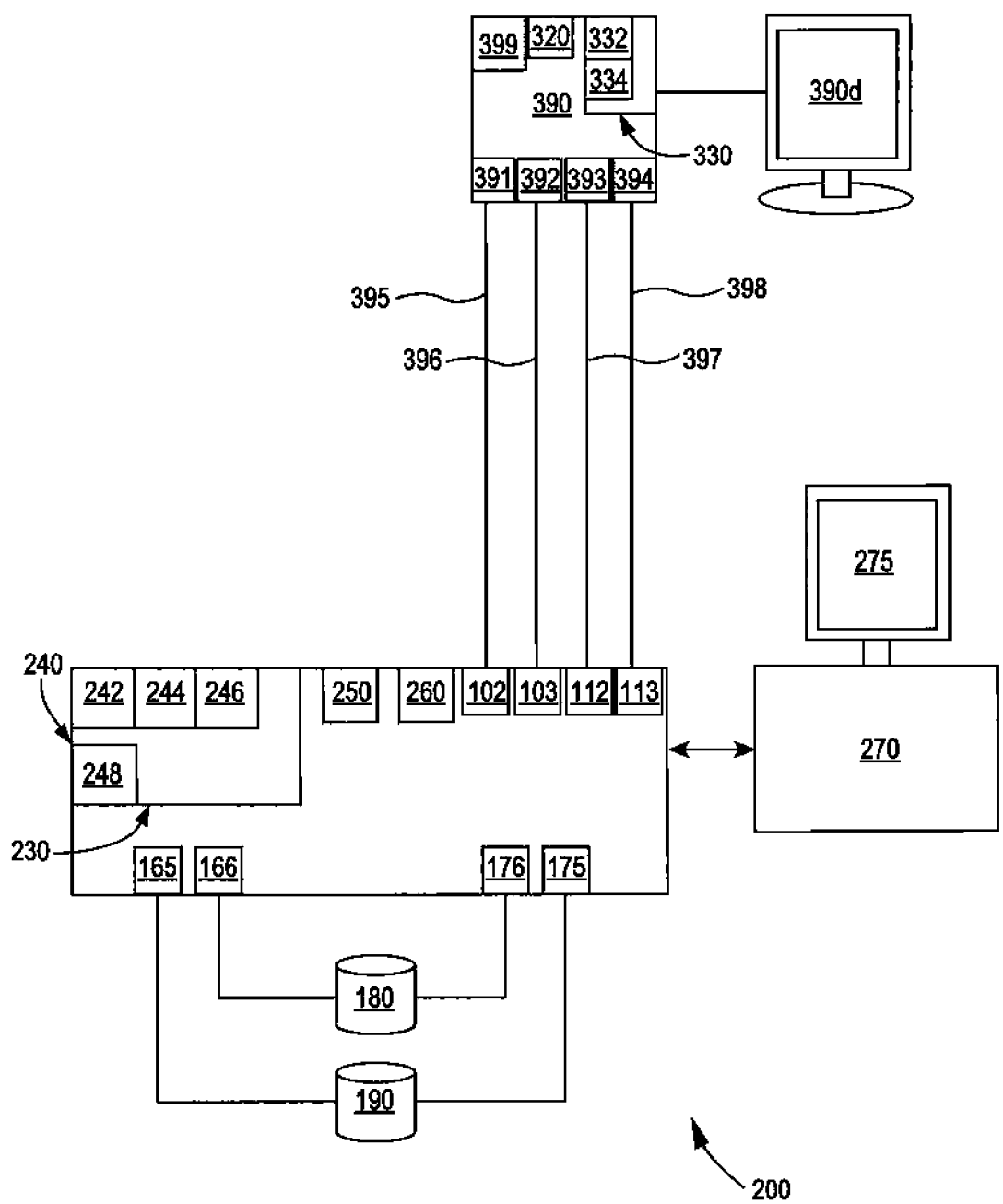
FIG. 2 is a block diagram showing a host computer in communication with Applicants' storage controller.
Figure 3:
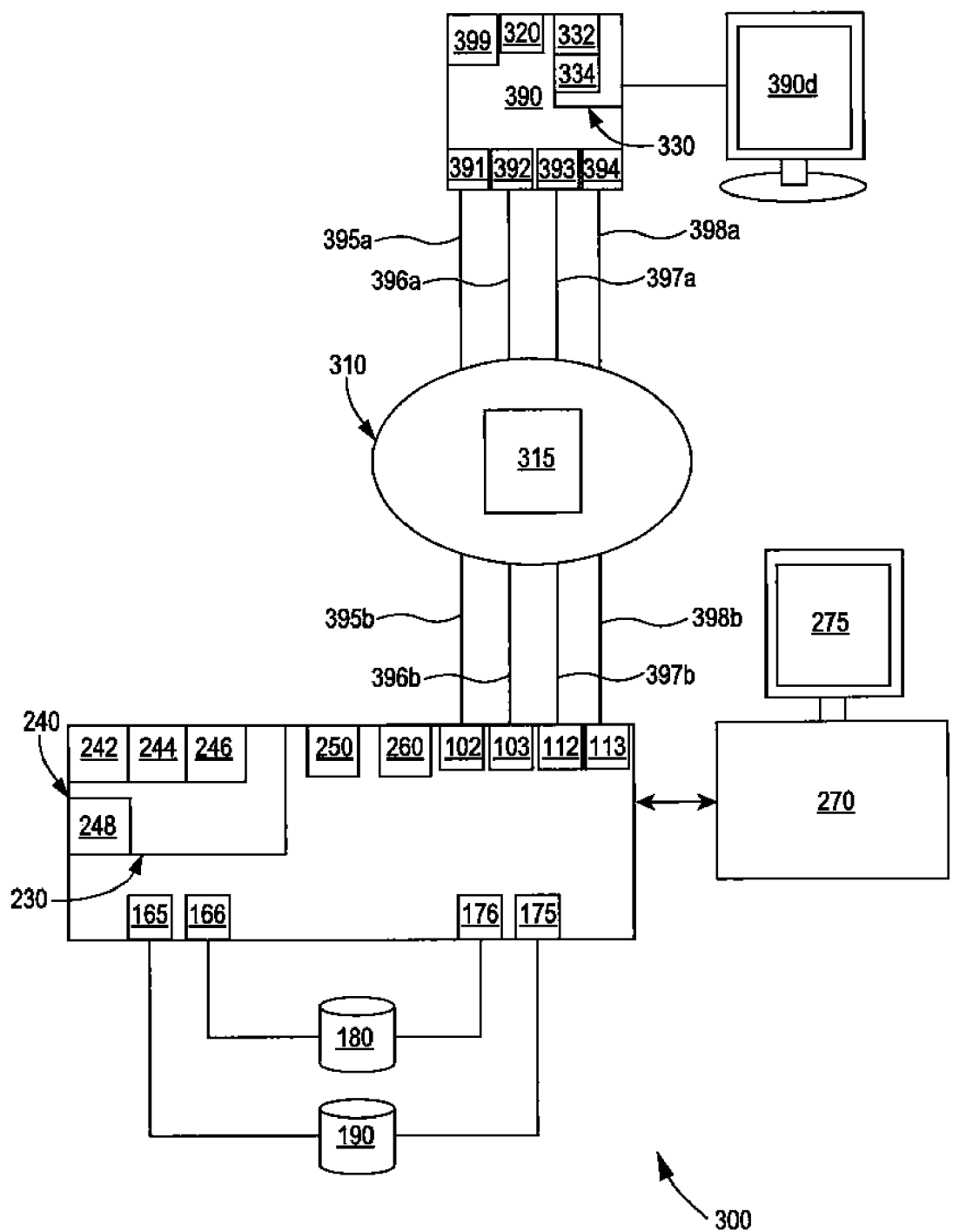
FIG. 3 is a block diagram showing a host computer in communication with Applicants' storage controller via a fabric comprising one or more switches.

In the illustrated embodiments of FIGS. 1, 2 and 3, host computer 390 comprises a plurality of channel path identifiers ("CHPids"), namely CHPids 391, 392, 393, and 394. CHPids 391, 392, 393, and 394, are physically interconnected to host adapters 102, 103, 112, and 113, respectively, disposed in storage controller 240 via communication paths 395, 396, 397, and 398, respectively. In the illustrated embodiment of FIGS. 1, 2 and 3, host computer 390 further comprises a communication path manager 399, wherein communication path manager 399 is in communication with each of CHPids 391, 392, 393, and 394. In certain embodiments, communication path manager 399 configures each of communication paths 395, 396, 397, and 398, to comprise up to 256 logical communication pathways.

In certain embodiments, host computer 390 further comprises computer readable medium 330, instructions 332 written to computer readable medium 330, and physical path failure log 334 written to computer readable medium 330. In the illustrated embodiment of FIGS. 1, 2, and 3, host computer 390 is interconnected with visual display device 390d. In certain embodiments, visual display device 390d is integral with host computer 390. In other embodiments, visual display device 390d is remote from host computer 390. In certain embodiments, visual display device 390d is located in a system administrators office.

In certain embodiments, Applicants' data storage system 100 comprises a first cluster 101A and a second cluster 101B, wherein clusters 101A and 101B are disposed in the same housing. In the illustrated embodiment of FIG. 1, data storage system 100 comprises a plurality of host adapters 102-105, 107-110, 112-115, and 117-120, disposed in four host bays 101, 106, 111, and 116. In other embodiments, Applicants' data storage system includes fewer than 16 host adapters. Regardless of the number of host adapters disposed in any embodiments of Applicants' system, each of those host adapters comprise a shared resource that have equal access to both central processing/cache elements 130 and 140.

Each host adapter may comprise one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage system 100.

Storage controller portion 130 includes processor 132 and cache 134. In certain embodiments, storage controller portion 130 further includes computer readable medium 133. In certain embodiments, computer readable medium 133 comprises random access memory. In certain embodiments, computer readable medium 133 comprises non-volatile memory.

Storage controller portion 130 further comprises communication path manager 135. In certain embodiments, communication path manager 135 comprises an embedded device disposed in storage controller portion 130. In other embodiments, communication path manager 135 comprises computer readable program code written to computer readable medium 133. Further in the illustrated embodiment of FIG. 1, instructions 136, and physical communication path failure log 138, are written to computer readable medium 133. Processor 132 utilizes instructions 136 to implement the steps of Applicants' method described herein.

Storage controller portion 140 includes processor 142 and cache 144. In certain embodiments, storage controller portion 140 further includes computer readable medium 143. In certain embodiments, computer readable medium 143 comprises random access memory. In certain embodiments, computer readable medium comprises non-volatile memory.

Storage controller portion 140 further comprises communication path manager 145. In certain embodiments, communication path manager 145 comprises an embedded device disposed in storage controller portion 140. In other embodiments, communication path manager 145 comprises computer readable program code written to computer readable medium 143. Further in the illustrated embodiment of FIG. 1, instructions 146, and physical communication path failure log 148, are written to computer readable medium 143. Processor 142 utilizes instructions 146 to implement the steps of Applicants' method described herein.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, storage controller portion 130, and one or more device adapters, are packaged together on a single card disposed in Applicants' data storage system. Similarly, in certain embodiments, one or more host adapters, storage controller portion 140, and one or more device adapters, are disposed on another card disposed in Applicants' data storage system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' data storage system includes more than two storage device arrays. Each storage array appears to a host computer as one or more logical devices.

In certain embodiments, one or more of the data storage devices comprise a plurality of hard disk drive units, such as plurality of disk drive units 180 and/or 190. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicants' system includes a single storage device array. In yet other embodiments, Applicants' system includes more than two storage device arrays.

In certain embodiments, data storage system 100 is in communication with a service center 270. In certain embodiments, data storage system 100 provides information relating to system performance to service center 270 at predetermined time intervals. In certain embodiments, data storage system 100 immediately provides error messages to service center 270 upon detection of a physical communication path performance degradation. In the illustrated embodiment of FIGS. 1, 2, and 3, service center 270 comprises a visual display device 275. En certain embodiments, data storage system 100 provides an error message which is visually displayed on visual display device if data storage system 100 detects a physical communication path error rate which exceeds a pre-determined threshold communication path error rate.

In the illustrated embodiment of FIG. 2, data storage system 200 comprises storage controller 240 which interconnects a plurality of data storage drives 180 and/or a plurality of data storage drives 190, with a computing device 390. In certain embodiments, storage controller 240 communicates with the plurality of data storage devices 180 via device adapters 166 and 176, and with plurality of data storage devices 190 via device adapters 165 and 175, using an I/O protocol selected from the group consisting of SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

Further in the illustrated embodiment of FIG. 2, Applicants' storage controller 240 is in communication with one host computers 390. In other embodiments, storage controller 240 is in communication with a plurality of host computers. As a general matter, hosts computers 390 comprises a computing device, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In the illustrated embodiment of FIGS. 2 and 3, Applicants' storage controller 240 comprises computer readable medium 230, microcode 242 written to computer readable medium 230, instructions 244 written to computer readable medium 230, threshold communication path error rate 246 written to computer readable medium 230, physical communication path failure log 248 written to computer readable medium 230, processor 250, and path management function 260. In the illustrated embodiment of FIGS. 2 and 3, path management function 260 comprises an embedded device disposed within storage controller 240. In other embodiments, path management function 260 comprises computer readable program code written to computer readable medium 230, wherein that computer readable program code is executed by processor 250.

In certain embodiments, storage controller 240 is in communication with a service center 270. In certain embodiments, storage controller 240 provides information relating to system performance to service center 270 at pre-determined time intervals. In certain embodiments, storage controller 240 immediately provides error message to service center 270 upon detection of a physical communication path performance degradation. In the illustrated embodiment of FIGS. 2, and 3, service center 270 comprises a visual display device 275. In certain embodiments, storage controller 240 provides an error message which is visually displayed on visual display device if storage controller 240 detects a physical communication path error rate which exceeds a pre-determined threshold communication path error rate.

In the illustrated embodiment of FIG. 3, host computer 390 and storage controller 240 communicate with one another via fabric 310. In certain embodiments, fabric 310 includes, for example, one or more FC switches 315. In certain embodiments, those one or more switches 315 comprise one or more conventional router switches. In the illustrated embodiment of FIG. 3, one or more switches 315 interconnect host computer 390 to storage controller 240 via communication paths 395a, 395b, 396a, 396b, 397a, 397b, 398 and/or 398b, using any type of I/O interface, for example, a Fibre Channel, Infiniband, Gigabit Ethernet, Ethernet, TCP/IP, iSCSI, SCSI I/O interface, or one or more signal lines used by FC switch 315 to transfer information trough, to, and from storage controller 240, and subsequently the plurality of data storage devices 180 and/or 190.

Figure 4:
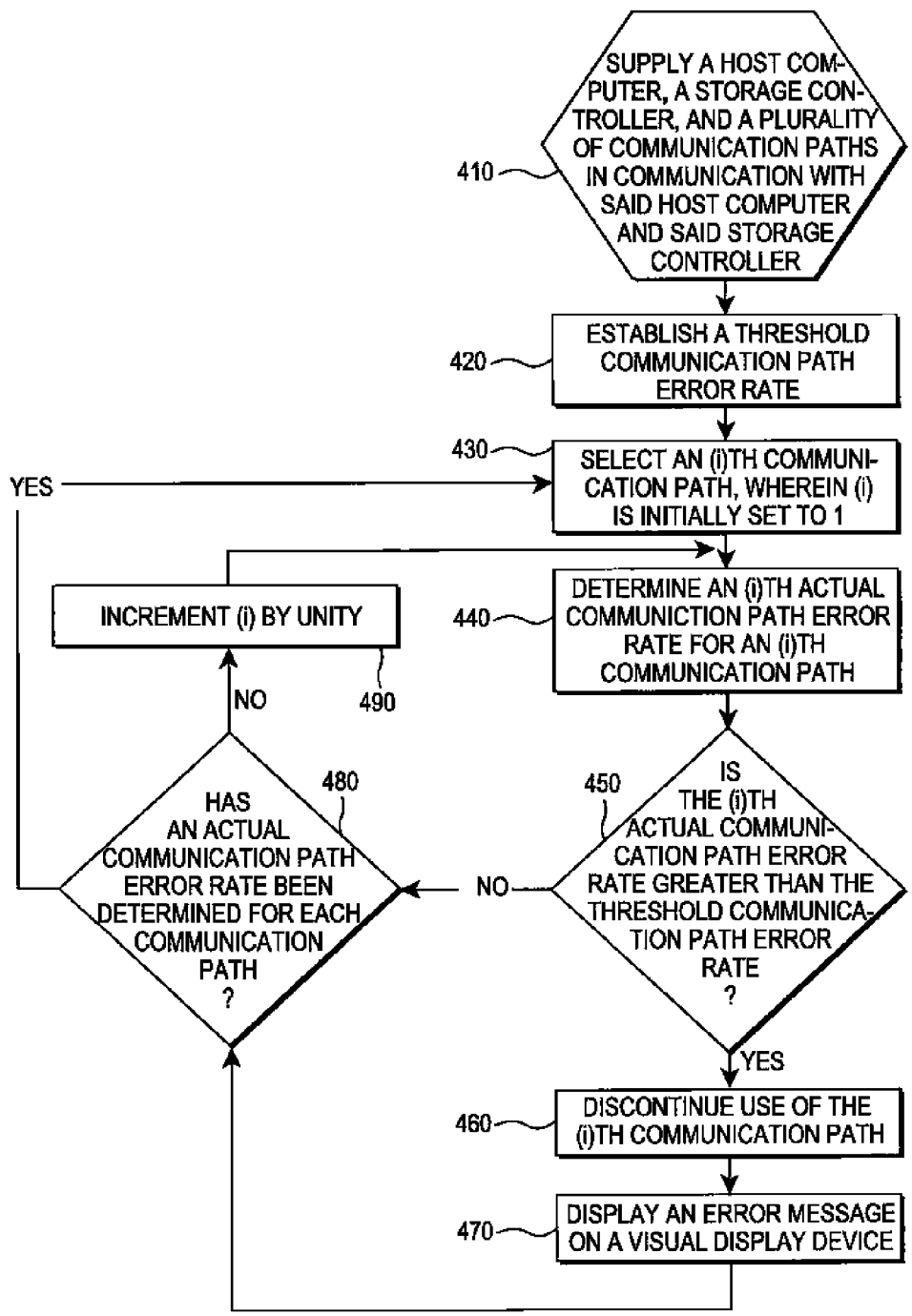
FIG. 4 is a flow chart summarizing the steps of Applicants' method.

Applicants' invention comprises a method to minimize performance degradation during communication path failure in a data processing system FIG. 4 summarizes the steps of Applicants' method.

In step 410, the method supplies a host computer, a storage controller, and a plurality of physical communication paths in communication with the host computer and the storage controller. In certain embodiments, step 410 comprises supplying a host computer comprising a communication path manager, such as communication path manager 399 (FIGS. 1, 2, 3). In certain embodiments, step 410 comprises supplying a host computer comprising a plurality of channel path identifiers, such as channel path identifiers 391 (FIGS. 1, 2, 3), 392 (FIGS. 1, 2, 3), 393 FIGS. 1, 2, 3), and 394 (FIGS. 1, 2, 3). In certain embodiments, step 410 comprises supplying a host computer interconnected with a visual display device, such as visual display device 390d (FIGS. 1, 2, 3).

In certain embodiments, step 410 comprises supplying a storage controller comprising a path management function, such as path management function 260 (FIGS. 2, 3). In certain embodiments, step 410 comprises supplying a service center, such as service center 270 (FIGS. 1, 2, 3), in communication with the storage controller of step 410, wherein that service center comprises a visual display device, such as visual display device 275 (FIGS. 1, 2, 3).

In certain embodiments, step 410 comprises supplying a data storage system, such as data storage system 100 (FIG. 1), comprising two clusters, such as clusters 101A (FIG. 1) and 101B (FIG. 1), wherein each cluster comprises a storage controller portion, such as storage controller portion 130 disposed in cluster 101A and storage controller portion 140 disposed in cluster 101B.

In certain embodiments, the plurality of communication paths of step 410 comprise a plurality of physical paths. In certain of these embodiments, one or more of the plurality of physical communication paths have been, or could be, configured to comprise a plurality of logical communication paths.

In step 420, the method establishes a threshold communication path error rate. In certain embodiments, the threshold communication path error rate of step 420 comprises the maximum number of I/O failures allowable during a specified time interval.

In certain embodiments, a threshold communication path error rate is set by the operator of each host computer. In these embodiments, if data storage system 100 (FIG. 1), or 200 (FIG. 1), or 300 (FIG. 3), is in communication with four (4) host computers, each of those host computers could specify a different and unique threshold communication path error rate. In certain embodiments, the threshold communication path error rate of step 420 is set by the operator of the data storage system 100 (FIG. 1), or storage controller 240 (FIGS. 2, 3).

In step 430, the method selects an (i)th communication path, wherein (i) is initially set to one. In certain embodiments, step 430 is performed by the host computer of step 410, such as host computer 390. In certain embodiments, step 430 is performed by a communication path manager, such as communication path manager 399, disposed in the host computer of step 410.

In certain embodiments, step 430 is performed by the storage controller, such as storage controller 240 (FIGS. 2, 3), of step 410. In certain embodiments, step 430 is performed by a path management function, such as path management function 260 (FIGS. 2, 3), disposed in the storage controller of step 410.

In certain embodiments, step 430 is performed by both clusters, such as clusters 101A and 101B, disposed in a data storage system, such as data storage system 100 (FIG. 1). In certain embodiments, step 430 is performed by a path management function, such as path management function 135 disposed in cluster 101A and/or by path management function 145 disposed in cluster 101B, disposed in each cluster in a data storage system.

In step 440, the method determines an (i)th actual communication path error rate for an (i)th physical communication path. In certain embodiments, step 440 is performed by the host computer of step 410, such as host computer 390. In certain embodiments, step 440 is performed by a communication path manager, such as communication path manager 399, disposed in the host computer of step 410.

In certain embodiments, step 440 is performed by the storage controller, such as storage controller 240 (FIGS. 2, 3), of step 410. In certain embodiments, step 440 is performed by a path management function, such as path management function 260 (FIGS. 2, 3), disposed in the storage controller of step 410.

In certain embodiments, step 440 is performed by both clusters, such as clusters 101A and 101B, disposed in a data storage system, such as data storage system 100 (FIG. 1). In certain embodiments, step 440 is performed by a path management function, such as path management function 135 disposed in cluster 101A and/or by path management function 145 disposed in cluster 101B, disposed in each cluster in a data storage system.

In step 450, the method determines if the (i)th actual communication path error rate of step 440 is greater than the threshold communication path error rate of step 420. In certain embodiments, step 450 is performed by the host computer of step 410, such as host computer 390. In certain embodiments, step 450 is performed by a communication path manager, such as communication path manager 399, disposed in the host computer of step 410.

In certain embodiments, step 450 is performed by the storage controller, such as storage controller 240 (FIGS. 2, 3), of step 410. In certain embodiments, step 450 is performed by a path management function, such as path management function 260 (FIGS. 2, 3), disposed in the storage controller of step 410.

In certain embodiments, step 450 is performed by both clusters, such as clusters 101A and 101B, disposed in a data storage system, such as data storage system 100 (FIG. 1). In certain embodiments, step 450 is performed by a path management function, such as path management function 135 disposed in cluster 101A and/or by path management function 145 disposed in cluster 101B, disposed in each cluster in a data storage system.

If the method determines in step 450 that the (i)th actual communication path error rate of step 440 is greater an the threshold communication path error rate of step 420, then the method transitions from step 450 to step 460 wherein the method discontinues using the (i)th physical communication path.

In certain embodiments, the (i)th physical communication path may comprise up to 256 logical communication paths. It may be the case that only one of those 256 logical communication paths has failed. By discontinuing use of the entire physical communication path, the use of operable logical communication paths is also discontinued. However, discontinuing use of the (i)th physical communication path avoids expending host computer processing time to identify the one or more failed logical communication paths. Repair of the physical connection can be deferred until a more convenient time when such repair causes no impact on data storage system performance.

For example, the determination that an (i)th actual communication path error rate exceeds a threshold communication path error rate may be made at a first time, but the identification of and/or repair of the one or more degraded logical communication paths configured by the (i)th physical communication path can be made at a second time, wherein the time interval between the first time, i.e. failure detection, and the second time, i.e. degraded logical path determination and repair, can be hours. In certain embodiments, the time interval between the first time and the second time can be as great as 24 hours.

In certain embodiments, step 460 is performed by the host computer of step 410, such as host computer 390. In certain embodiments, step 460 is performed by a communication path manager, such as communication path manager 399, disposed in the host computer of step 410.

In certain embodiments, step 460 is performed by the storage controller, such as storage controller 240 (FIGS. 2, 3), of step 410. In certain embodiments, step 460 is performed by a path management function, such as path management function 260 (FIGS. 2, 3), disposed in the storage controller of step 410.

In certain embodiments, step 460 is performed by both clusters, such as clusters 101A and 101B, disposed in a data storage system, such as data storage system 100 (FIG. 1). In certain embodiments, step 460 is performed by a path management function, such as path management function 135 disposed in cluster 101A and/or by path management function 145 disposed in cluster 101B, disposed in each cluster in a data storage system.

In step 470, the method displays an error message on a visual display device. In certain embodiments, step 470 further comprises making a log entry to a physical communication path failure log, such as log 138 (FIG. 1), and/or log 148 (FIG. 1), and/or log 248 (FIGS. 2, 3), and/or log 334 (FIG. 1). In certain embodiments, step 470 further comprises providing the physical communication path failure log entry to a service center.

In certain embodiments, step 470 is performed by the host computer of step 410, such as host computer 390, wherein the error message is displayed on a visual display device, such as visual display device 390d. In certain embodiments, step 470 is performed by a communication path manager, such as communication path manager 399, disposed in the host computer of step 410, wherein the error message is displayed on a visual display device, such as visual display device 390d.

In certain embodiments, step 470 is performed by the storage controller, such as storage controller 240 (FIGS. 2, 3), of step 410, wherein the error message is displayed on a visual display device, such as visual display device 275 disposed in a service center in communication with the storage controller. In certain embodiments, step 460 is performed by a path management function, such as path management function 260 (FIGS. 2, 3), disposed in the storage controller of step 410, wherein the error message is displayed on a visual display device, such as visual display device 275 disposed in a service center in communication with the storage controller.

In certain embodiments, step 470 is performed by both clusters, such as clusters 101A and 101B, disposed in a data storage system, such as data storage system 100 (FIG. 1), wherein if either cluster determines in step 450 that an (i)th actual communication path error rate of step 440 is greater than the threshold communication path error rate of step 420, then an error message is displayed on a visual display device, such as visual display device 275 disposed in a service center in communication with the data storage system. In certain embodiments, step 460 is performed by a path management function, such as path management function 135 disposed in cluster 101A and/or by path management function 145 disposed in cluster 101B, disposed in each cluster in a data storage system, wherein if either path management function 135 or 145 determines in step 450 that an (i)th actual communication path error rate of step 440 is greater than the threshold communication path error rate of step 420 an error message is displayed on a visual display device, such as visual display device 275 disposed in a service center in communication with the data storage system.

In step 480, the method determines if an actual communication path error rate has been determined for each of the plurality of communication paths of step 410. For example, if the plurality of communication paths of step 410 comprise (N) communication paths, then in step 480 the method determines if (i) equals A). In certain embodiments, step 480 is performed by the host computer of step 410, such as host computer 390. In certain embodiments, step 480 is performed by a communication path manager, such as communication path manager 399, disposed in the host computer of step 410.

In certain embodiments, step 480 is performed by the storage controller, such as storage controller 240 (FIGS. 2, 3), of step 410. In certain embodiments, step 480 is performed by a path management function, such as path management function 260 (FIGS. 2, 3), disposed in the storage controller of step 410.

In certain embodiments, step 480 is performed by both clusters, such as clusters 101A and 101B, disposed in a data storage system, such as data storage system 100 (FIG. 1). In certain embodiments, step 480 is performed by a path management function, such as path management function 135 disposed in cluster 101A and/or by path management function 145 disposed in cluster 101B, disposed in each cluster in a data storage system.

If the method determines in step 480 that an actual communication path error rate has not been determined for each of the plurality of communication paths of step 410, then the method transitions from step 480 to step 490 wherein the method increments (i) by unity, and transitions from step 490 to step 430 and continues as described herein. In certain embodiments, step 490 is performed by the host computer of step 410, such as host computer 390. In certain embodiments, step 490 is performed by a communication path manager, such as communication path manager 399, disposed in the host computer of step 410.

In certain embodiments, step 490 is performed by the storage controller, such as storage controller 240 (FIGS. 2, 3), of step 410. In certain embodiments, step 490 is performed by a path management function, such as path management function 260 (FIGS. 2, 3), disposed in the storage controller of step 410.

In certain embodiments, step 490 is performed by both clusters, such as clusters 101A and 101B, disposed in a data storage system, such as data storage system 100 (FIG. 1). In certain embodiments, step 490 is performed by a path management function, such as path management function 135 disposed in cluster 101A and/or by path management function 145 disposed in cluster 101B, disposed in each cluster in a data storage system.

If the method determines in step 480 that an actual communication path error rate has been determined for each of the plurality of communication paths of step 410, then the method transitions from step 480 to step 430 and continues as described herein. In certain embodiments, after determining in step 480 that an actual communication path error rate has been determined for each of the plurality of communication paths of step 410, the method transition to, and performs, step 430 after a time interval defined by the threshold communication path error rate of step 420.

As an example, if the threshold communication path error rate is based upon a number of I/O failures per minute, then the method performs step 430 within about one minute after transitioning from step 480. Similarly, if the threshold communication path error rate is based upon a number of I/O failures per hour, then the method performs step 430 within about one hour after transitioning from step 480. If the threshold communication path error rate is based upon a number of I/O failures per day, then the method performs step 430 within about one day after transitioning from step 480.

In certain embodiments, individual steps recited in FIG. 4 may be combined, eliminated, or reordered.

In certain embodiments, Applicants' invention includes instructions, such as instructions 136 (FIG. 1) and/or 146 (FIG. 1), residing in computer readable medium 133 (FIG. 1) and/or 143 (FIG. 1), respectively, and/or instructions 246 (FIGS. 2, 3) residing in computer readable medium 230 (FIGS. 2, 3), and/or instructions 332 residing in computer readable medium 330, wherein those instructions are executed by a processor, such as processor 132 (FIG. 1), and/or 142 (FIG. 1), and/or 250 (FIG. 2), and/or 320 (FIG. 1), to perform one or more of steps 420, 430, 440, 450, 460, 470, 480, and/or 490, recited in FIG. 4.

In other embodiments, Applicants' invention includes instructions residing in any other computer program product, where those instructions are executed by a computer external to, or internal to, data storage system 100 (FIG. 1), or 200 (FIG. 2), or 300 (FIG. 3), to perform one or more of steps 420, 430, 440, 450, 460, 470, 480, and/or 490, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to minimize performance degradation during communication path failure in a data processing system, comprising:

supplying a plurality of host computers, a storage controller comprising a path management function, and a plurality of physical communication paths interconnecting each of said host computers and said storage controller, wherein each host computer comprises a communication path manager, a plurality of channel path identifiers, and a visual display device, wherein for each host computer a communication path manager is in communication with each of said channel path identifiers;

establishing a different threshold communication path error rate for each of the host computers;

configuring by a communication path manager each physical communication path to comprise up to 256 logical communication pathways;

determining by said path management function an actual communication path error rate for each logical communication pathway;

operative if an actual communication pathway error rate is greater than an associated threshold communication path error rate:

discontinuing by said path management function use of an (i)th physical communication path configured to comprise a logical pathway having an error rate greater than said associated threshold communication path error rate; and displaying by said communication path manager an error message on said visual display device.

2. The method of claim 1, said method further comprising:
rejecting by said host computer communication path manager any I/O received from said storage controller using said (i)th physical communication path.

3. The method of claim 2, wherein said supplying step further comprises supplying a visual display device in communication with said host computer, said method further comprising visually displaying on said visual display device an error message reading that an (i)th actual communication path error rate is greater than said threshold communication path error rate.

4. The method of claim 3, wherein said supplying step further comprises supplying a host computer comprising a communication path error log, said method further comprising:
making a communication path error log entry comprising the date and time, and indicating that an (i)th actual communication path error rate is greater than said threshold communication path error rate.

5. The method of claim 1, said method further comprising:
providing an instruction by said communication management function to said host computer using a (j)th physical communication path to discontinue use of said (i)th physical communication path, wherein said (j)th physical communication path is one of said plurality of communication paths in communication with said host computer and said storage controller, and wherein said (i)th physical communication path differs from said (j)th physical communication path;
rejecting by said storage controller communication management function any I/O received from said host computer using said (i)th physical communication path.

6. The method of claim 5, wherein said supplying step further comprises supplying a service center in communication with said storage controller, wherein said service center comprises a visual display device, said method further comprising displaying on said visual display device an error message reading that an (i)th actual communication path error rate is greater than said threshold communication path error rate.

7. The method of claim 6, wherein said supplying step further comprises supplying a storage controller comprising a communication path error log, said method further comprising:
making a communication path error log entry comprising the date and time, and indicating that an (i)th actual communication path error rate is greater than said threshold communication path error rate; and
providing said log entry to said service center.

8. The method of claim 1, wherein said supplying step further comprises supplying a data storage system comprising:
a first cluster and a second cluster, wherein said first cluster and said second cluster are disposed in the same housing;
wherein said first cluster comprises a first storage controller assembly comprising a first processor and a first communication management function, and wherein said second cluster comprises a second storage controller assembly comprising a second processor and a second communication management function, and wherein said data storage system is in communication with said host computer via said plurality of physical communication paths;

wherein said method comprises:
determining by said first communication management function said (i)th actual communication path error rate;
operative if said (i)th actual first communication path error rate is greater than said threshold communication path error rate, providing an instruction by said first communication management function to said host computer using a (j)th physical communication path to discontinue use of said (i)th physical communication path, wherein said (j)th physical communication path is one of said plurality of communication paths in communication with said host computer and said storage controller, and wherein said (i)th physical communication path differs from said (j)th physical communication path;
rejecting by said first storage controller assembly any I/O received from said host computer using said (i)th physical communication path.

9. The method of claim 8, further comprising:
determining by said second communication management function said (i)th actual communication path error rate;
operative if said (i)th actual first communication path error rate is greater than said threshold communication path error rate, providing an instruction by said second communication management function to said host computer using a (j)th physical communication path to discontinue use of said (i)th physical communication path, wherein said (j)th physical communication path is one of said plurality of communication paths in communication with said host computer and said storage controller, and wherein said (i)th physical communication path differs from said (j)th physical communication path;
rejecting by said second storage controller assembly any I/O received from said host computer using said (i)th physical communication path.

10. The method of claim 8, wherein said supplying step further comprises supplying a data storage system comprising a communication path error log and a service center in communication with said data storage system, wherein said service center comprises a visual display device, said method further comprising:
displaying on said visual display device an error message reading that an (i)th actual communication path error rate is greater than said threshold communication path error rate;
making a communication path error log entry comprising the date and time, and indicating that an (i)th actual communication path error rate is greater than said threshold communication path error rate; and
providing said log entry to said service center.

11. A data storage system comprising a computer readable medium comprising computer readable program code disposed therein to minimize performance degradation during communication path failure in a data processing system, wherein said data storage system comprises, a first cluster and a second cluster, wherein said first cluster and said second cluster are disposed in the same housing, wherein said first cluster comprises a first storage controller assembly comprising a first processor and a first communication management function, and wherein said second cluster comprises a second storage controller assembly comprising a second processor and a second communication management function, wherein said data storage system is in communication with a service center comprising a first visual display device, and wherein said data storage system is in communication with a plurality of host computers via a plurality of physical communication paths, wherein each host computer comprises a communication path manager, a plurality of channel path identifiers, and a second visual display device, wherein said communication path manager is in communication with each of said channel path identifiers, the computer readable program code comprising a series of computer readable program steps to effect:

configuring by each communication path manager each physical communication path to comprise up to 256 logical communication pathways;

retrieving a different pre-determined threshold communication path error rate for each host computer;

determining by said first communication management function an actual communication path error rate for each logical communication pathway, operative if an actual communication pathway error rate is greater than an associated threshold communication path error rate:

discontinuing by said first communication management function use of an (i)th physical communication path configured to comprise a logical pathway having an error rate greater than said associated threshold communication path error rate;

providing an immediate error message to said service center; and displaying said error message on said first visual display device.

12. The data storage system of claim 11, said computer readable program code further comprising a series of computer readable program steps to effect: providing an instruction by said first communication management function to said host computer using a (j)th physical communication path to discontinue use of said (i)th physical communication path, wherein said (j)th physical communication path is one of said plurality of communication paths in communication with said host computer and said storage controller, and wherein said (i)th physical communication path differs from said (j)th physical communication path;

rejecting by said first storage controller assembly any I/O received from said host computer using said (i)th physical communication path.

13. The data storage system of claim 12, the computer readable program code comprising a series of computer readable program steps to effect:

determining by said second communication management function an actual communication path error rate for each logical communication pathway;

discontinuing by said second communication management function use of an (i)th physical communication path configured to comprise a logical pathway having an error rate greater than said associated threshold communication path error rate; providing an instruction by said second communication management function to said computing device using a (j)th physical communication path to discontinue use of said (i)th physical communication path, wherein said (j)th physical communication path is one of said plurality of communication paths in communication with said host computer and said storage controller, and wherein said (i)th physical communication path differs from said (j)th physical communication path;

rejecting by said second storage controller assembly any I/O received from said computing device using said (i)th physical communication path.

14. The data storage system of claim 13, wherein said data storage system further comprises a communication path error log, said computer readable program code further comprising a series of computer readable program steps to effect:

visually displaying on said visual display device an error message reading that an (i)th actual communication path error rate is greater than said threshold communication path error rate;

making a communication path error log entry comprising the date, time, and indicating that (i)th actual communication path error rate is greater than said threshold communication path error rate; and providing said log entry to said service center.

* * * * *